Patented Mar. 17, 1953

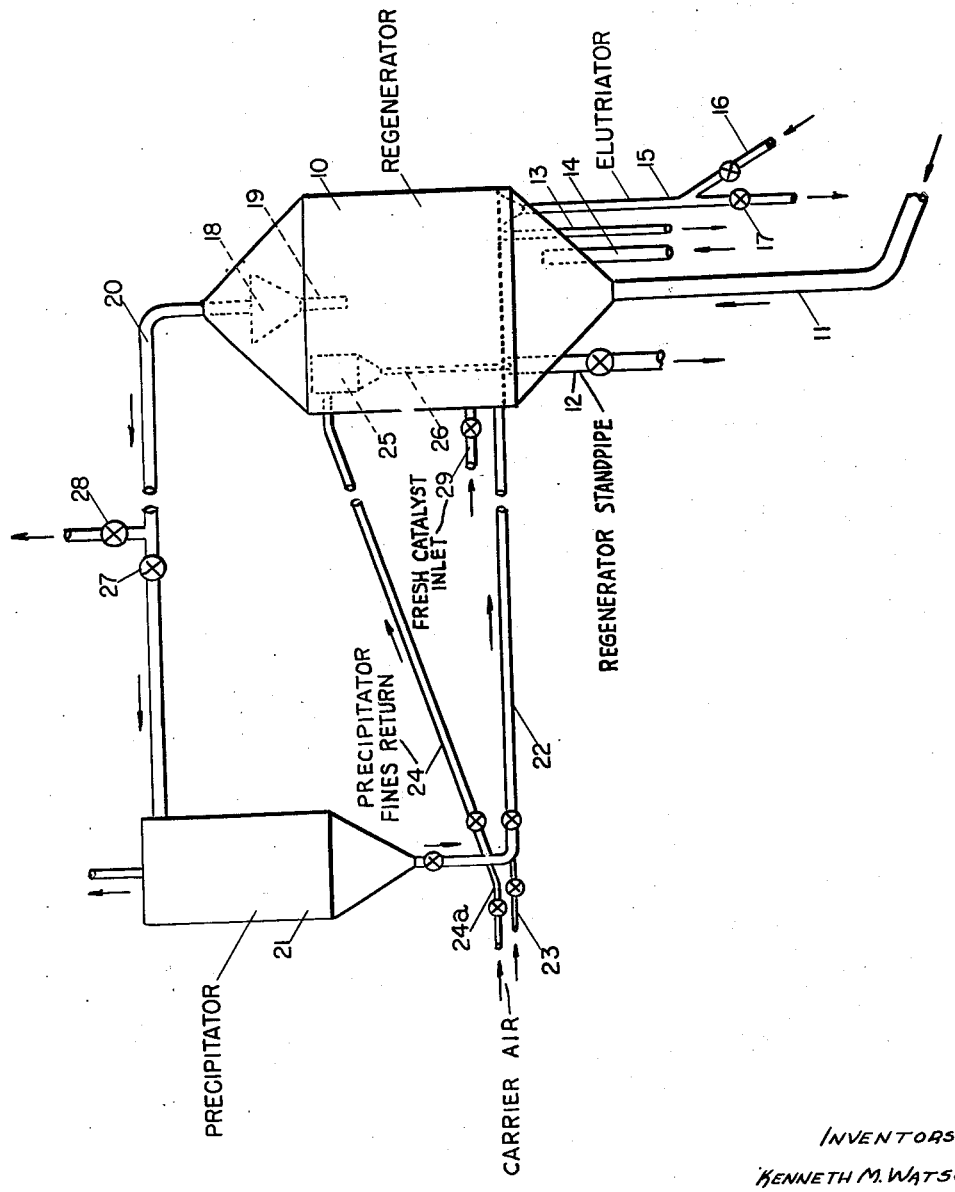

2,631,981

UNITED STATES PATENT OFFICE 2,631,981

REJECTION OF INACTIVE MATERIAL FROM A FLUIDIZED CATALYST REGENERATOR

Kenneth M. Watson, Madison, Wis., Robert E. Howe, Sinclair, Wyo., and Robert Lormer Smith, Western Springs, Ill., assignors to Sinclair Refining Company, New York, N. Y., a corporation of Maine Application July 10, 1948, Serial No. 38,145

1 Claim. (Cl. 252—417)

This invention relates to the beneficiation of finely divided catalysts used in so-called fluid catalytic processes by selective segregation of low activity particles. This invention relates to a method and apparatus for selectively rejecting large, dense catalyst particles of low activity from the regeneration zone of a fluid catalytic process of the type employed in the pyrolytic conversion of petroleum.

In petroleum conversion processes of the type contemplated by this inventions a finely divided catalyst is suspended in oil vapors, at elevated temperature, and the suspension is passed to a reaction zone in which conversion of the oil occurs. The spent catalyst is separated from oil vapors, stripped of oil and regenerated by burning off the coke or carbon deposited thereon in a regeneration zone in the presence of air or other oxidizing gas. The regenerated catalyst is then returned to the process by resuspension in the oil vapor feed. This general type of process is commonly termed a fluid catalytic cracking process, and catalysts useful therein are termed fluid catalysts.

In the regeneration cycle, every effort consistant with efficient operation is made to conserve the inventory of circulating catalyst for obvious economic reasons. Yet in the course of repeated regeneration cycles, the activity level of the circulating catalyst charge falls until a point is reached when a portion of the circulating catalyst charge must be replaced with fresh make-up catalyst to maintain an efficient operative level of catalyst activity. It is obviously a desideratum of catalyst replacement to restrict the rejection of catalyst from the system to that portion of the charge having minimum activity in order to maintain a high level of catalyst activity with the attendant economic advantages of improved product distribution and quality without excessive make-up requirements.

In application, Serial No. 38,144 filed July 10, 1948, Howe, Olson, and Teter have described the association of catalyst activity with particle density and spatial area and have described a method for beneficiating fluid catalysts by selectively segregating high density-low activity particles. Their method, however, advantageously demands a preliminary particle size classification of the catalyst to produce particle size fractions of relatively narrow size distribution or the pre-selection of a portion of regenerated catalyst of suitably homogeneous character from the system to obtain optimum density classification. We have found, however, that a relatively small quantity of large catalyst particles of high density and low activity may be removed directly from the regeneration zone by incorporating the principle of mass classification by elutriation into regenerator operation. By our method large dense catalyst particles may be selectively and continuously, if desired, rejected from the over-all catalyst mass without requiring separate screening equipment or large scale air separation equipment. A high level of catalyst activity may be maintained with reduced make-up requirements or a higher level of catalyst activity may be obtained with a fixed rate of make-up catalyst.

According to our method, continuous or periodic rejection of large dense catalyst particles of low activity is obtained by providing a settling channel or chamber opening into the regenerated catalyst bed in the regenerated catalyst zone. A fluid medium, advantageously a portion of the regenerator combustion air, is introduced to the channel, and the rate of flow is controlled so as to float or carry back by the character of its flow all but the largest and heaviest particles of regenerated catalyst which flow into the open end of the settling channel. Advantageously, the elutriating medium may be supplied rapid cycles, resulting in short-frequency pulsations. Pulsation may be effected by a rapidly rotating valve or similar scheme, and the frequency of pulsation may vary from say 40 to 600 pulsations per minute, depending upon operation requirements. The fraction of large dense catalyst particles which settles at the foot of or lowest point of the settling channel is predetermined by establishing an appropriate pressure and rate of flow, or frequency of pulsation of the elutriating medium, and these particles are continuously or intermittently withdrawn and discarded from the process.

By contrast, catalyst rejection in conventional operations is accomplished either through incidental loss of fines, or by the withdrawal of a portion of the charge circulating in the unit, or more often by a combination of both methods. The former method has the disadvantage of rejecting much high-grade catalyst, especially when the fresh catalyst contains a large proportion of fines as in the case of natural clay catalyst. Virgin catalyst fines have an activity equal to or better than the average of the fresh catalyst and where catalyst rejection is accomplished solely through rejetion of fines a major portion of the rejected material may comprise fresh catalyst of small particle size and high activity. Rejection of catalyst by withdrawal of a portion of the charge circulating in the unit has the obvious disadvantage of rejecting material of quality equal to the average of that in use, and the rejected material will include particles of highest as well as lowest activity.

Accordingly, the use of our method of selectively rejecting large dense particles of catalyst from the overall catalyst in the regeneration zone promotes effective capitalization of catalyst values while maintaining equilibrium activity at a high level. Further, to obtain the maximum benefit from the catalytic values of the fines fraction substantially all catalyst fines carried off in the course of regeneration by the combustion gases are advantageously returned to the regeneration zone. Smith and Watson in co-pending application Serial No. 38,146 filed July 10, 1948, now Patent No. 2,596,748, have disclosed that the initially high catalyst values present in the fines portion of the over-all catalyst are reduced in a normal period of operation following the addition of fresh catalyst, say about 10 days, to well below the average activity level of the over-all catalyst. They have accordingly devised a method by which make-up catalyst is added batchwise or intermittently and the rejection of fines from the system is correlated with the time of adding fresh catalyst, so that substantially all fines are returned to the system except during a short period immediately prior to the next addition of make-up, when all suspended fines are rejected from the system. This system of operation is advantageously combined with the method of this invention to selectively reject large dense catalyst particles from the over-all catalyst in the course of the regeneration cycle, while retaining the maximum amount of fines until the catalyst inventory has been so depleted that the addition of fresh make-up catalyst is required.

By holding the incidental loss of fines to a minimum until the catalytic values of the fines fraction have been substantially depleted while selectively rejecting large dense particles of low activity, the rejected material will always be of lower activity and of less value than the circulating catalyst. For this reason a given average catalyst activity can be maintained with a smaller make-up rate of fresh catalyst, or a higher level of activity can be maintained with a fixed rate of make-up. For example, when maintaining an average activity index of 30 (by the D. & L. method), the material rejected by regeneration and elutriation may have an activity index of only 15. Similarly, the fines rejected at the end of a 10-day operational period without fresh catalyst addition typically may show an activity index of only 20, whereas the activity of the entire charge of catalyst has fallen to only 27.

Our invention will be further illustrated by the embodiment disclosed in the attached schematic drawing. Spent catalyst is charged to regenerator 10 through regenerator riser 11 where it is continuously subjected to regeneration by burning off adherent carbonaceous matter by means of air or other oxidizing gas. Combustion air is ordinarily supplied at various points directly to the bed or regenerated catalyst. The catalyst bed is maintained in a fluidized condition by the percolation of the combustion air and combustion gases, and regenerated catalyst flows from a high point in the bed into the regenerator standpipe 12 for return to the reaction zone. The temperature within the regenerator is controlled by recycling a portion of the regenerated catalyst through a cooler and waste-heat boiler (not shown) by means of recycle standpipe 13 and recycle riser 14. An elutriation channel which as shown consists of a vertical cylindrical pipe 15 is inserted in the catalyst bed. An elutriation medium which for example consists of a portion of the combustion air used for regeneration is introduced to the elutriation column by means of air line 16. The rate of air flow is so adjusted that the catalyst, which spills into the top of settling column 15 is classified according to mass. The large dense particles drop down against the rising stream of air, and the smaller lighter particles are carried back into the regenerator. If the air rate is so adjusted that the portion of dense material collected is relatively small, this material will be of minimum activity and value, and is profitably rejected from the system. The large dense particles that settle through the stream of elutriating air collect at the foot of settling column 15 and are withdrawn at a rate governed by valve 17, which advantageously is of the slide valve type.

The combustion gases arising in regenerator 10 carry off in suspension large quantities of catalyst fines and pass from the chamber through a nest of air separators of the cyclone or centrifugal type indicated at 18. The larger particles of the fines stream are knocked out in these cyclone separators and drop back into the regenerator through a common drop-leg 19. The stream of fines passing overhead through line 20 is then conventionally passed through coolers (not shown) to recover the sensible heat contained therein by generating steam in a waste heat boiler, and thence are passed to an electrostatic precipitating system or other means for concentrating superfine particles 21. The concentrate is returned to the system as by line 22 assisted by carrier air introduced at 23, and the overhead is usually released to the atmosphere. In one embodiment of our invention, make-up catalyst is advantageously added at periodic intervals and for the operating period following each addition the fines fraction recovered from the concentrating unit is returned to the regenerator through line 24 to auxiliary centrifugal separator 25, advantageously with a minimum quantity of carrying air injected at 24a. The recovered fines are then advantageously dropped by means of dip-leg 26 directly into regenerator standpipe 12. For a short period of operation immediately preceding the addition of make-up catalyst, the stream of fines to concentrating unit 21 and to auxiliary cyclone 25 is released to the atmosphere by blocking valve 27 and opening valve 28, or alternatively fines are collected in the precipitator as during normal operation and then discharged into a bin or hopper instead of being returned to the system. Fresh catalyst may be added to the system as by line 29 to the regenerator or by introduction to the oil charge line.

We have described the use of a vertical elutriation column but obviously other elutriator designs such as chambers or curved channels may be utilized. In addition, the regenerator cyclone return may be adapted for elutriation of the heavier fines fraction returned from the cyclones, so that a small fraction of low activity may be discarded and the elutriated fines then returned to the regenerated catalyst bed or directly to the reaction zone. Likewise the means of access to the catalyst may be varied, but it is generally desirable to elutriate fully regenerated catalyst which has more uniform surface and density characteristics than untreated spent catalyst. Although we prefer to employ a portion of the combustion air required for regeneration as an elutriating medium other gaseous or vaporous media may be used. Also a vaporizable liquid medium may be substituted as the elutriating medium. The removal of the settled catalyst particles may be effected continuously or intermittently depending upon the rate of accumulation and the design of the elutriating channel selected.

We claim:

In a catalytic process utilizing a finely divided solid catalyst in which spent catalyst is introduced to a regeneration zone wherein carbonaceous matter is continuously removed from said spent catalyst by combustion with an oxidizing gas, in which the products of combustion are withdrawn from the upper end of said regeneration zone substantially free of catalyst except catalyst fines, and in which regenerated catalyst is withdrawn from the lower portion of said regeneration zone, said finely divided solid catalyst being a mixture of particle size fractions ranging from large particles to small particles, the method of selectively rejecting said large particles when they attain a predetermined density consonant with low-activity which includes directing the regenerated catalyst in the regeneration zone over a settling zone in direct communication with the lower portion of said regeneration zone, introducing an elutriating medium in short frequency pulsations into said settling zone and directing its flow upwardly into the regenerated catalyst in the regeneration zone, regulating the upward flow of said elutriating medium to permit countercurrent downward passage therethrough into the lower portion of said settling zone of only those large particles having said predetermined density, and removing the large dense particles in the lower portion of the settling zone from the system thereby affecting a high level of catalyst activity in the system.

KENNETH M. WATSON.
ROBERT E. HOWE.
ROBERT LORMER SMITH.

REFERENCES CITED

The following references are of record in the file of this patent:

UNITED STATES PATENTS

| Number | Name | Date |
|---|---|---|
| 2,161,500 | Bird et al. | June 6, 1939 |
| 2,311,564 | Munday | Feb. 16, 1943 |
| 2,325,611 | Keranen | Aug. 3, 1943 |
| 2,337,684 | Scheineman | Dec. 28, 1943 |
| 2,349,574 | Conn | Nov. 23, 1944 |
| 2,355,016 | Stein | Aug. 1, 1944 |
| 2,362,270 | Hemminger | Nov. 7, 1944 |
| 2,387,798 | Kubicek et al. | Oct. 30, 1945 |
| 2,391,334 | Nicholson | Dec. 18, 1945 |
| 2,399,050 | Martin | Apr. 23, 1946 |
| 2,410,284 | Gunness et al. | Oct. 29, 1946 |
| 2,419,098 | Stratford et al. | Apr. 15, 1947 |
| 2,420,049 | Martin | May 6, 1947 |
| 2,420,632 | Tyson | May 13, 1947 |
| 2,421,664 | Tyson | June 3, 1947 |
| 2,423,813 | Lechthaler et al. | July 8, 1947 |
| 2,429,127 | Graham et al. | Oct. 14, 1947 |
| 2,430,015 | Hatton et al. | Nov. 4, 1947 |
| 2,433,798 | Voorhees | Dec. 30, 1947 |
| 2,434,567 | Jahnig et al. | Jan. 13, 1948 |
| 2,445,351 | Gohr | July 20, 1948 |
| 2,451,619 | Hengstebeck et al. | Oct. 19, 1948 |
| 2,483,485 | Barr | Oct. 4, 1949 |
| 2,506,307 | Martin | May 2, 1950 |
| 2,531,192 | Bergstrom | Nov. 21, 1950 |
| 2,567,207 | Hoge | Sept. 11, 1951 |

FOREIGN PATENTS

| Number | Country | Date |
|---|---|---|
| 585,354 | Great Britain | Feb. 5, 1947 |